May 5, 1970          E. L. CLARKE          3,509,701

HEADER FLOATATION MECHANISM

Filed April 5, 1968          2 Sheets-Sheet 1

INVENTOR.
EVANS L. CLARKE.
BY
SETTLE, BATCHELDER & OLTMAN.
ATT'YS.

May 5, 1970  E. L. CLARKE  3,509,701
HEADER FLOATATION MECHANISM
Filed April 5, 1968  2 Sheets-Sheet 2

INVENTOR.
EVANS L. CLARKE.
BY
SETTLE, BATCHELDER & OLTMAN.
ATT'YS.

United States Patent Office 3,509,701
Patented May 5, 1970

3,509,701
HEADER FLOTATION MECHANISM
Evans L. Clarke, Sherrard, Ill., assignor to J. I. Case
Company, Racine, Wis., a corporation of Wisconsin
Filed Apr. 5, 1968, Ser. No. 719,109
Int. Cl. A01d 67/00
U.S. Cl. 56—208                                    9 Claims

ABSTRACT OF THE DISCLOSURE

The float and adjusting mechanism for a crop treating part pivotally supported on a mobile frame in overhanging relation with respect to one end of the frame. The crop treating part is raised and lowered with respect to the frame through fluid rams selectively supplied with fluid from a reservoir by a pump with the flow being controlled by a valve and an accumulator connected between the valve and the fluid rams. The accumulator floatingly mounts the crop treating part on the frame. The control valve is capable of isolating the fluid rams and the accumulator whenever the control valve is in the neutral position and also provides a restricted flow from the ram to the reservoir while allowing for unrestricted flow from the pump to the fluid rams.

BACKGROUND OF THE INVENTION

The present invention relates generally to agricultural machines for treating crops and more particularly to a floating and adjusting mechanism for a crop treating part of a harvesting machine.

In agricultural machines, such as combines and windrowers, it is substantially essential that the crop treating part or header be adjustable with respect to the remainder of the harvesting implement. This is generally accomplished by pivotally mounting the crop treating part in overhanging relation with respect to one end of the remainder of the machine and raising and lowering the crop treating part through suitable mechanical or hydraulic mechanisms.

Thus, one manner of adjusting the crop treating part or header is to pivotally mount the header adjacent one end of the remainder of the machine and connect fluid rams between the machine and the header. Fluid is selectively supplied to and discharged from the fluid rams through a control valve having pressured fluid supplied thereto from a pump connected to a reservoir.

One of the principal problems with this arrangement is that when large agricultural implements of this type are produced, the excessive weight of the header results in several distinct disadvantages. The primary disadvantage is that the entire weight adjacent normally the forward end of the machine is carried by the forward and normally traction wheels of the vehicle and this weight has a tendency to reduce the weight adjacent the rear or steering wheels of the vehicle. This results in a variation in traction of the vehicle when the machine is driven across rough terrain wherein the header tends to bounce with respect to the remainder of the frame.

Another disadvantage in this arrangement is that when harvesting many crops, such as soy beans or other crops growing close to the ground, problems frequently arise in that the header must be at approximately ground level. In order to accomplish this, it is customary to provide some type of ground engaging shoes on the lower surface of the header and thus allow the header to ride along the ground. In the relatively heavy headers of the present day type, this results in the header at times digging into the ground and at other times bouncing with respect to the main frame of the machine when the header encounters ridges, etc. on the ground.

A further disadvantage of the above type of mechanism is that, because of the various ground irregularities normally encountered, it is many times necessary for the operator of the combine to continuously readjust the header height through the manual control means. This is of course not only time consuming but also very annoying to the operator.

Furthermore, it is many times desirable to have a predetermined setting of the header with respect to the combine frame which is normally accomplished through visual checking of the header height and a hit or miss proposition in readjusting the header height after the header has for any reason been required to be raised, as at the end of a field. It is appreciated that prior devices have been proposed for mounting the header with respect to the machine, which incorporates springs such as shown in Pat. No. 3,264,808. However, such devices have not been satisfactory in actual use.

SUMMARY OF THE INVENTION

In order to overcome the above-mentioned difficulties, the present invention contemplates the provision of floating means for mounting the header with respect to the main frame of an agricultural implement.

Thus, the primary object of the present invention is to provide a hydraulic mechanism for floatingly mounting a crop treating part with respect to the main frame of an agricultural implement.

Another object is to provide mechanism interposed between the crop treating part and the frame of an agricultural implement which will essentially lighten the crop treating part with respect to the main frame of an implement.

A further object is to provide a hydraulic mechanism for raising and lowering a crop treating part with respect to the main frame of an implement and which incorporates an accumulator for absorbing shock loads between the crop treating part and the main frame.

A still further object is to provide a control mechanism for a crop treating part which is capable of being set at a predetermined position and which floatingly mounts the crop treating part with respect to the main frame of the implement.

Other objects of this invention will appear in the following description and appended claims, reference being had to the accompanying drawings forming a part of this specification wherein like reference characters designate corresponding parts in the several views.

DETAILED DESCRIPTION

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
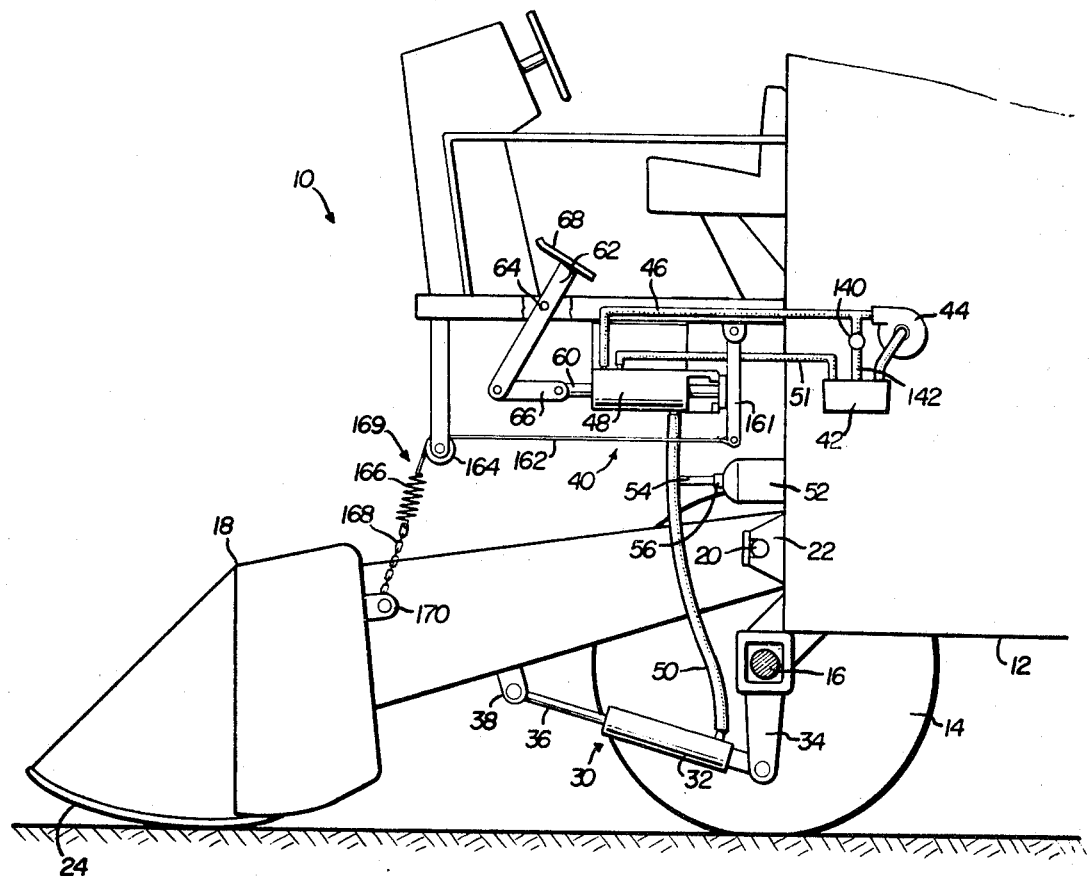
FIG. 1 shows a fragmentary side elevation view of an agricultural implement, such as a combine, incorporating the features of the present invention.

FIG. 1 of the drawings generally discloses a combine 10, chosen for purposes of illustration only, which includes a main frame 12 supported by spaced traction wheels 14 (only one being shown) supported on an axial structure 16. A header 18 is pivotally supported at the forward end of the main frame through a shaft 20 pivotally carried by spaced brackets 22 (only one being shown) adjacent one end of the mobile frame 12. Normally the crop treating part 18 is partially supported by ground engaging shoes 24. While a combine has been shown for purposes of illustration, it is readily apparent that the present invention is capable of being incorporated in any mechanism wherein a crop treating part or header is pivotally supported with respect to the main frame of the implement, such as windrowers, etc.

Pivotal movement to raise and lower the crop treating part 18 with respect to the main frame 12 is generally imparted through one or more fluid rams 30 having the cylinder 32 thereof pivotally supported on ears 34 and the piston 36 thereof pivotally supported on the crop treating part through ears 38.

According to the present invention, a hydraulic control system for supplying fluid to and discharging fluid from the fluid ram 30 incorporates mechanism which will floatingly mount the crop treating part 18 with respect to the mobile frame 12 of the implement, as well as automatically position the crop treating part at a predetermined position with respect to the frame. This is accomplished by providing several elements in the control mechanism which will now be described.

The hydraulic control system 40 includes a fluid reservoir 42, a fluid pressure pump 44 connected through a conduit 46 to a control valve 48. The output port of the control valve 48 is connected to the fluid cylinder 32 of the ram assembly 30 through a conduit 50 while the return port of the valve 48 is connected through conduit 51 to the reservoir 42.

According to the primary aspect of the present invention, means are provided for absorbing the shock load applied to the crop treating part 18. This is accomplished by providing an accumulator 52 in open communication through a conduit 54 with the conduit 50 which interconnects the control valve 48 with the fluid ram 30. The accumulator 52 is of the liquid-gas type with the liquid or fluid port 56 connected to conduit 54 while the opposite end of the accumulator is connected to a pressured gas source 58. Means, to be described hereinafter, are incorporated in the control valve so as to isolate the accumulator 52 and the fluid ram 30 from the remainder of the control system when the control valve is in the neutral position.

Thus, the forces applied by the crop treating part 18 to the fluid within the cylinder 32 and conduit 50 are absorbed or at least partially absorbed by the pressured gas within the accumulator to thereby floatingly support the header 18 with respect to the main frame 12. It can readily be appreciated that a spring-like action is provided by the accumulator between the vehicle and the header due to the viscous elasticity of the fluid and the opposed gaseous charge, such as nitrogen, in the accumulator. Of course, various types of accumulators such as one in which the gas is in direct communication with the fluid or with a slidable piston interposed between the the fluid and the gas, may be utilized in the present invention.

Of course, fluid is selectively supplied to and discharged from the fluid ram by moving the piston 60 of the control valve 48 in opposite directions from a neutral position. This is accomplished by a control member 62 pivoted intermediate its ends at 64 in the cab portion of the vehicle and connected at the opposite end through a link 66 to the valve spool 60. In the illustrated embodiment, the control means is shown as having a foot pedal 68 adjacent the opposite ends thereof. However, it is readily apparent that various types of control means either hand operated or various other manual control means may be provided.

According to another aspect of the invention, the control valve 48 produces three fluid passages between the reservoir, the pump and the fluid ram. Also, the control valve incorporates mechanism for limiting the fluid flow from the fluid ram to the reservoir and means for isolating the fluid ram and accumulator from the remainder of the hydraulic system when the valve is in the neutral position.

As shown in FIGS. 3 through 6 of the drawings, the control valve 48 includes a housing 70 having an opening 72 therein slidably supporting the valve spool 60. The housing 70 has a fluid inlet opening 74 connected to the pump through conduit 46, a working outlet 76 connected through conduit 50 to the fluid ram 30 and a fluid return opening 78 connected through conduit 51 to the reservoir 42.

The opening or bore 72 for the valve spool 60 has a plurality of enlarged ports 80, 82, 84, 86 88 and 90 spaced axially thereof. Port 82 is in open communication with the inlet opening 74 through a passage 100 while ports 80, 84, and 90 are in open communication with the outlet or return opening 78 through a passage 102 defined in the housing 70. Likewise, port 88 communicates with the workport or opening 76 through a passage 104 while port 86 is in communication with port 82 through a passage 106 defined in housing 70.

Figure 4:
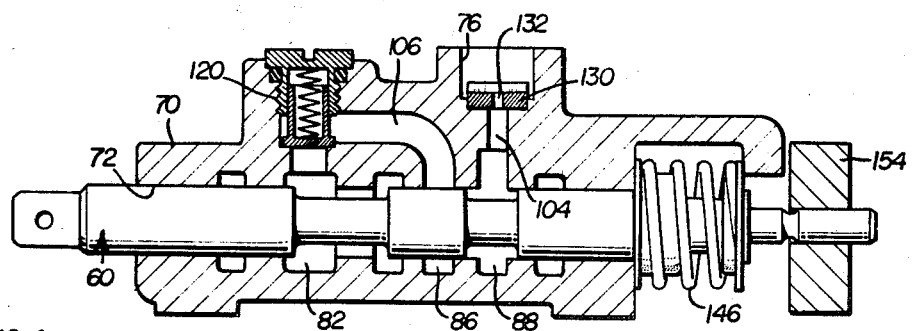
FIG. 4 is a sectional view taken generally along lines 4—4 of FIG. 3.
Figure 6:
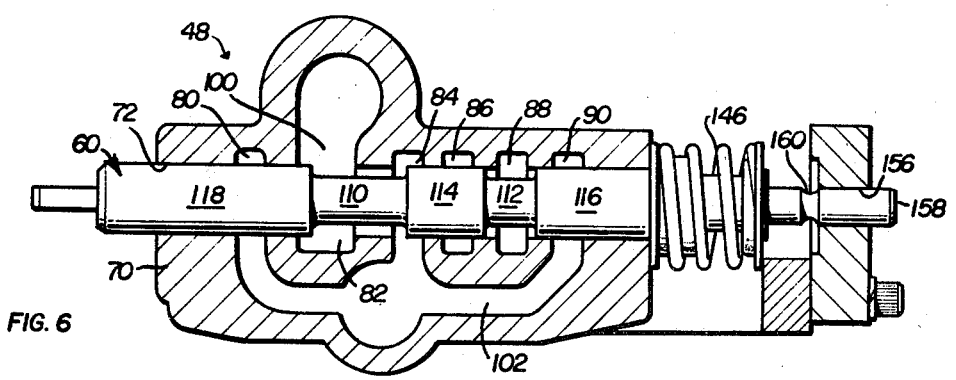
FIG. 6 is a vertical sectional view taken generally along lines 6—6 of FIG. 5.
Figure 5:
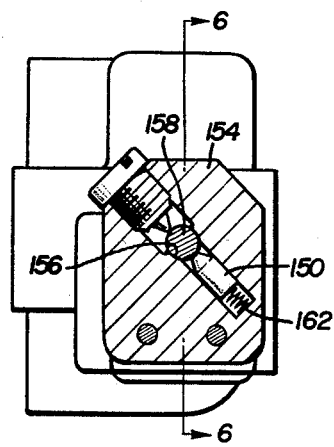
FIG. 5 is an end transverse sectional view taken generally along lines 5—5 of FIG. 3.

The valve spool 60 also has a pair of spaced reduced portions 110 and 112 interconnected by an enlarged portion 114 and having enlarged portions 116 and 118 on opposite sides thereof to selectively connect spaced ports with each other while blocking the remaining ports from fluid flow therethrough. Thus, as shown in the neutral position in FIG. 6, the inlet opening 74 is in open communication with the fluid return opening 78 through passage 100, and the open area between the reduced portion 110 and valve bore 72. An inspection of FIGS. 4 and 6 shows that the enlarged portion or land 114 and land 116 isolate port 88 to thereby close the working port of the valve in the neutral position.

In order to raise the header with respect to the main frame of the implement, fluid must be supplied to the working outlet 76. This is accomplished by moving the valve spool 60 leftward as viewed in FIGS. 4 and 6 to place ports 86 and 88 in communication with each other through the reduced area portion 112 of the valve spool. Thus, fluid can flow through passage 106 from the inlet port 82 to the working port 88.

As was mentioned above, means are provided for blocking the fluid flow from the working outlet to the fluid inlet 74 when the valve is in other than the raising position. This is accomplished by a spring biased one way check valve 120 (FIG. 4) located in the passage 106 defining the second fluid passageway of the valve. Thus, whenever the valve spool is either in the neutral or lowering position (to be described hereinafter), the spring biased check valve 120 will be in the position shown in FIGURE 4 to block the fluid flow through passage 106 from the working port 88 to the fluid inlet port 82. This is of extreme importance in having a working mechanism since, when the valve spool is in the neutral position, it is imperature that no fluid flow occur between the working port or the fluid ram and the inlet port of the valve.

According to another aspect of the invention, means are provided for producing relatively unlimited flow between the fluid inlet port and the work port of the valve while restricting the flow from the work port to the reservoir. This is accomplished by placing a restrictor plate 130 having a reduced opening 132 in the conduit 50 or in the passageway 104 within the valve. Thus, when fluid is flowing from the pump through the passageway defined by passage 106 and ports 86 and 88, the pressure within passage 104 is greater than that within the conduit 50 to raise the restrictor 130 thus allowing substantially unrestricted flow from the pump to the fluid ram. However, when fluid is flowing from the ram to the reservoir, the pressure within conduit 50 is greater than that within passage 104 thus locating the restrictor 130 in the position shown in FIG. 4 to produce restricted flow through opening 132 from the ram to the reservoir.

Figure 2:
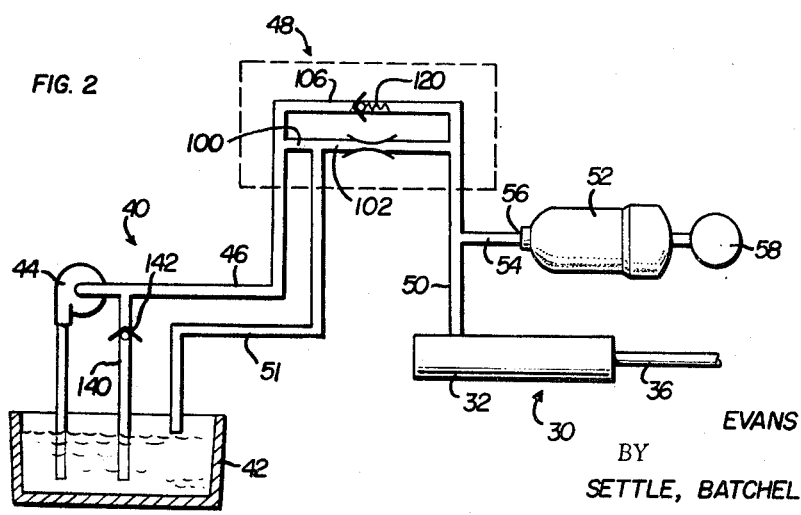
FIG. 2 schematically shows the hydraulic control circuit incorporated in the implement shown in FIG. 1.
Figure 3:
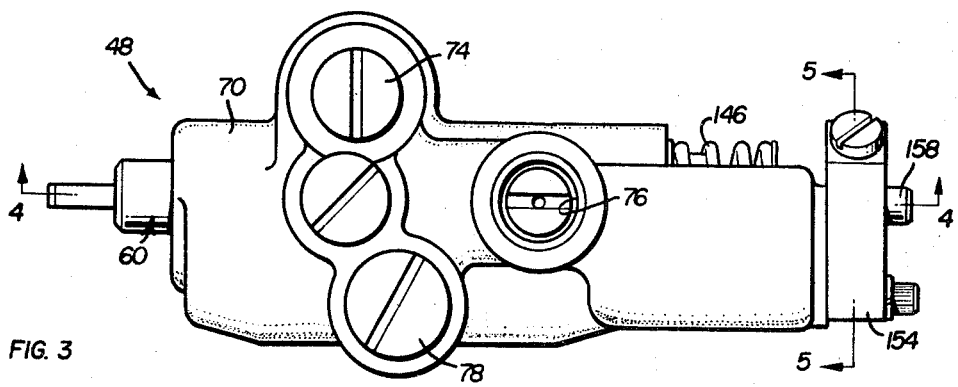
FIG. 3 is a plan view of the control valve forming part of the control system shown in FIG. 1.

According to another aspect of the invention, means are provided for automatically moving the valve spool 60 to the neutral position when the header 18 is at its maximum raised position and when the header is at predetermined lowered position with respect to the main frame of the implement. The raising of the implement is produced by actuating the foot control lever 62 to move the valve spool 60 leftward as viewed in the drawings. If the operator continues to hold the pedal rearwardly as viewed in FIG. 1 after the cylinder assembly or ram 30 is in the completely extended position, the pressure within the conduits 46 and 50 will increase to a point wherein a spring biased check valve 140 in conduit 142 (FIGS. 1 and 2) connecting conduit 46 with the reservoir 42 will open to thereby allow a bypass between the pump and the reservoir. When this occurs, the centering spring 146 will be operative to move the valve spool 60 to the neutral position.

According to another aspect of the invention, means are provided for maintaining the valve spool in the lowering position whenever the foot operated lever 62 is actuated to move the valve spool rightwardly, as viewed in the drawings. The valve spool is releasably locked in the lowering position by a spring biased plunger or detent 150 (FIGS. 5 and 6) slidable within an opening 152 in a block 154 carried adjacent one end of the valve spool housing 70. The block 154 has an opening 156 extending transversely of the opening 150 and slidably receiving an extension 158 formed on the end of the valve spool 60. The extension 158 has a reduced portion or recess 160 which is located in alignment with the opening 150 whenever the valve spool is moved to a lowering position. A spring 162 urges the detent or member 150, into engagement with the extension 158 and has a free end thereof received in the recess 160 whenever the valve spool is in a lowering position.

Thus, it can be appreciated that whenever the valve spool is moved to the lowering position, the member 150 will automatically be forced into the recess 160 to thereby lock the valve spool in the lowering position.

Additional means are provided for releasing the locking means or member 150 whenever the header 18 is at a predetermined position with respect to the implement frame 12. The releasing or neutralizing means includes a lever 161 (FIG. 1) having one end pivotally supported on the frame 12 adjacent the end of the control valve 48. The opposite end of the lever 161 has a cable 162 connected thereto which is journaled over a pulley 164 supported on the frame 12 and has its opposite end connected to a spring 166. The free end of the spring has one end of a chain 168 connected thereto while the opposite end of the chain is connected to a fixed lug 170 carried on the header 18. The chain 168 has links selectively receivable by the end of the spring to thereby increase or decrease the effective length of the entire cable assembly 169 including the cable 162, spring 166 and chain 168.

Thus, whenever the valve spool is moved to the lowering position, the releasable detent 150 automatically locks the valve spool in the lowering position and, when the header is at a predetermined lowered position with respect to the frame 12, the cable assembly will pivot the lever 161 with respect to the frame 50 and engage the end of the valve spool extension 158 to overcome the bias of the spring 162 and allow the centering spring 146 to move the valve spool to the neutral position.

Of course, to accomplish this, the force of spring 166 must be greater than that of spring 162. Also, the provision of spring 166 in the cable assembly will allow the operator to manually override the control of the neutralizing means and lower the header to any position.

OPERATION

It is believed that the operation of the present invention can be appreciated from the above description. When the valve spool is in its centered or neutral position, the pump 44 is in direct communication with the reservoir 42 through the fluid passageway defined by passage 100, ports 82 and 84, and conduits 46 and 51. When the crop treating part or header 18 is desired to be raised with respect to the main frame 12, the foot pedal 68 is engaged at its rearward end to move the valve spool leftwardly as viewed in the drawings. This places the pump in communication with the ram 30 through a fluid passageway defined by the passage 106 having the spring biased check valve 120 therein. Of course, the force of the pressured fluid will open the check valve to allow substantially unrestricted flow from the pump to the ram. When the rain is in its completely extended position and the rearward end of the foot pedal 68 remains engaged, the spring biased check vlave 140 will open to allow the pressured fluid produced by the pump 44 to pass through bypass line 142 and return to the reservoir 42.

When the operator desires to return the header to its working position he merely depresses the foot pedal 68 at its forward end which moves the valve spool rightwardly as viewed in the drawings to have the plunger 150 received in the recess 160 and lock the valve pool in its lowering position. Fluid will then continue to pass through the restrictor 130 and a third passageway defined by fluid passages 102 and 104, and ports 88 and 90 as well as conduits 50 and 51 to reservoir 42. When the header has been lowered to the predetermined setting, determined by the effective length of the cable assembly including cable 162, spring 166 and chain 168, the tensioning of this cable assembly will cause the lever 161 to engage the end of the extension 158 and release the detent and member 150. Thus, the centering spring 146 will move the valve spring to the neutral position.

When the valve spool is move to the neutral position, spring biased check valve 120 will close the passageway from the ram to the pump and will thus isolate the accumulator 52 and fluid ram 30 from the remainder of the hydraulic control system. In this position, the gaseous charge within the accumulator will act on the fluid within conduit 50 and set up a spring-like or floating action between the header and the vehicle due to the viscous elasticity of the fluid and the opposed gaseous charge. In other words, part of the load of the header will be absorbed by the pressured gas within the accumulator to effectively lighten the header with respect to the main frame of the implement.

Thus, when the header is positioned to ride on the ground, the effective weight of the header may be readily adjusted by lengthening or shortening the neutralizing cable assembly to produce a predetermined lowered position of the header with respect to the implement. Of course, if the operator wishes to change the ground pressure while he is moving along the field, he may override the neutralizing system of the assembly to lower the header below the predetermined setting and thus increase the ground pressure produced by the header.

From the above description it can be appreciated that the present mechanism for floatingly mounting the header with respect to the main frame of the vehicle has a considerable number of advantages over other mechanisms such as springs. Thus, the shocks produced on the header are immediately absorbed by the gaseous pressure charge to reduce the bounce of the header. The mechanism of the present invention is easier to adjust, the floating force applied to the header may be adjusted while the vehicle is in motion, the mechanism is very simple to mount, is neater in appearance and is very easily incorporated in any present day system. This is of course readily apparent since it is only necessary to replace the control valve with a control valve constructed in accordance with the present invention, connect an accumulator to the conduit leading from the fluid ram to the control valve and supply a cable assembly 169.

While one exemplary embodiment of the invention has been described in detail, it will be apparent to those skilled in the art that the disclosed embodiment may be modified.

What is claimed is:

1. Apparatus for supporting a relatively heavy element pivotally supported in overhanging relation adjacent one end of a ground-traversing machine including a fluid actuated extensible member interposed between said element and machine, control means for selectively supplying fluid to and discharging fluid from said member, conduit means interconnecting said control means and said member and normally having fluid trapped therein, and a float mechanism for said element, the improvement of said floating mechanism comprising an accumulator in open communication with said conduit means and pressured gas in said accumulator in force opposing relation to said fluid whereby the forces applied to said fluid from said element will be absorbed by said pressured gas to floatingly support said element on said machine.

2. Apparatus as defined in claim 1, and in which said control means includes a pump supplying pressured fluid through a second conduit from a reservoir to a control valve having a spool shiftable to raising and lowering positions from a neutral position, further improvement of first means for locking said spool in said lowering position and second means having a first connection with said machine and a second connection with said element and cooperating with said spool to release said first means and allow said spool to move to said neutral position when said said element reaches a predetermined position with respect to said machine.

3. Apparatus as defined in claim 2, in which said valve includes means producing restricted flow from said extensible member to said reservoir when said valve is in said lowering position.

4. Apparatus as defined in claim 1, which said control means includes a pump supplying pressured fluid from a source through a control valve to said member and return means through said valve to said reservoir, including the further improvement of means providing substantially unrestricted flow from said pump to said member and restricting the flow from said member to said source.

5. Apparatus for controlling the position of a crop treating part pivotally mounted on an agricultural machine comprising a fluid source, a pump supplying pressure fluid, a fluid operated cylinder and piston assembly interposed between said machine and said part and a control valve selectively actuatable to supply pressured fluid to said cylinder to raise said part and discharge fluid from said cylinder to lower said part, the improvement of a gas and liquid accumulator having the liquid section in open communication with said cylinder, and means for isolating said accumulator and cylinder from said control valve and said pump when said valve is in the neutral condition whereby said gas absorbs the pressure applied to said fluid by said crop treating part.

6. Apparttus as defined in claim 5, including the further improvement of neutralizing means having a connection with said part and engagable with said control valve to move said valve to a neutral position when said part is at a predetermined position with respect to said machine.

7. Apparatus as defined in claim 6, including the further improvement of means releasably retaining said valve at a lowered, actuated position for discharging fluid until said neutralizing means engages said valve.

8. Apparatus as defined in claim 5, in which said control valve includes a housing and a valve spool shiftable in said housing between neutral raising and lowering positions, the further improvement of means defining a first fluid passageway in said housing connecting said pump to said cylinder when said valve spool is in the raising position, means defining a second fluid passageway connecting said ram to said source when said valve spool is in said lowering position, means defining a third fluid passageway connecting said pump with said source when said valve spool is in a neutral position, means in said first passageway limiting flow from said pump to said ram, and means producing restricted flow through said second fluid passageway when said valve spool is in the lowering position while allowing substantially unrestricted flow through said first fluid passageway when said valve spool is in the raising position.

9. Apparatus as defined in claim 8, further including releasable means cooperating between said housing and said valve spool retaining said valve spool in a lowering position, and neutralizing means connected to said port and said machine and engagable with said valve spool to disengage said releasable means and allow said valve spool to move to the neutral position when said port is at a predetermined lowering position with respect to said machine.

References Cited

UNITED STATES PATENTS

| | | | |
|---|---|---|---|
| 3,137,984 | 6/1964 | Shonkwiler | 56—214 |
| 3,163,974 | 1/1965 | Mack | 56—214 |
| 3,309,852 | 3/1967 | Allen | 56—208 |
| 3,349,747 | 10/1967 | Vande Wiele. | |

ANTONIO F. GUIDA, Primary Examiner

J. A. OLIFF, Assistant Examiner